(12) United States Patent
Anderson

(10) Patent No.: US 8,893,213 B2
(45) Date of Patent: Nov. 18, 2014

(54) CONTENT SYNCHRONIZATION TECHNIQUES

(75) Inventor: Glen J. Anderson, Beaverton, OR (US)

(73) Assignee: Intel Corporation, Santa Claus, CA (US)

( * ) Notice: Subject to any disclaimer, the term of this patent is extended or adjusted under 35 U.S.C. 154(b) by 913 days.

(21) Appl. No.: 12/826,923

(22) Filed: Jun. 30, 2010

(65) Prior Publication Data

US 2012/0002952 A1  Jan. 5, 2012

(51) Int. Cl.
| | |
|---|---|
| H04N 7/18 | (2006.01) |
| H04N 7/173 | (2011.01) |
| H04N 21/436 | (2011.01) |
| H04N 21/466 | (2011.01) |
| H04N 5/765 | (2006.01) |
| G11B 27/034 | (2006.01) |
| H04N 21/41 | (2011.01) |

(52) U.S. Cl.
CPC ......... *H04N 5/765* (2013.01); *H04N 21/43622* (2013.01); *H04N 21/466* (2013.01); *G11B 27/034* (2013.01); *H04N 21/4126* (2013.01)
USPC .............................. 725/134; 725/80; 725/115

(58) Field of Classification Search
None
See application file for complete search history.

(56) References Cited

U.S. PATENT DOCUMENTS

| | | | |
|---|---|---|---|
| 2004/0142711 A1* | 7/2004 | Mahonen et al. | 455/502 |
| 2004/0237104 A1* | 11/2004 | Cooper et al. | 725/38 |
| 2005/0079860 A1 | 4/2005 | Binar | |
| 2006/0174008 A1* | 8/2006 | Abanami | 709/227 |
| 2008/0208607 A1 | 8/2008 | Ma | |
| 2011/0273625 A1* | 11/2011 | McMahon et al. | 348/734 |

FOREIGN PATENT DOCUMENTS

EP  1722303 A1  11/2006

* cited by examiner

*Primary Examiner* — Brian T Pendleton
*Assistant Examiner* — Jean D Saint Cyr
(74) *Attorney, Agent, or Firm* — Blakely, Sokoloff, Taylor & Zafman LLP

(57) ABSTRACT

Techniques are disclosed that involve copying recorded content from a host device (e.g., a PVR) to a portable device. A storage medium within the portable device may include a portion that is assigned to store desired content received from the host device. Allocation of this portion may be based on a user selection. In embodiments, content may be automatically copied ("synchronized") from the host device to the portable device. This copying may be based on various factors, such as previous synchronization and/or outputting activities.

20 Claims, 4 Drawing Sheets

CONTENT SYNCHRONIZATION TECHNIQUES

BACKGROUND

Personal video recorders (PVRs) allow for users to have television shows and other video automatically recorded. In turn, these shows and video may be viewed by a user at his or her convenience. As PVRs are typically stationary devices, such viewing is often through a stationary device, such as a fixed television.

Portable devices with video capabilities are becoming increasingly common. Users may synchronize such portable devices with PVRs. In other words, a portable device may connect to a PVR and receive content stored by the PVR (e.g., stored within the PVR's disk drive). Currently, the process of synchronizing with a PVR is a manual one. Thus, users have to choose individual television shows and "sync" them (obtain them from the PVR).

Further, if a user watches a show on his or her mobile device, the PVR does not "know" that the show has been viewed. As a result, the user has to manually update the PVR (e.g., by deleting shows already watched, etc.). This shortcoming complicates user involvement with the PVR. This can be especially challenging when multiple users of the PVR have their own portable video player devices.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein.

DETAILED DESCRIPTION

Embodiments provide techniques that involve copying recorded content from a host device (e.g., a PVR) to a portable device. A storage medium within the portable device may include a portion that is assigned to store desired content received from the host device. Allocation of this portion may be based on a user selection. In embodiments, content may be automatically copied ("synchronized") from the host device to the portable device. This copying may be based on various factors, such as previous synchronization and/or outputting activities.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Operations for the embodiments may be further described with reference to the following figures and accompanying examples. Some of the figures may include a logic flow. Although such figures presented herein may include a particular logic flow, it can be appreciated that the logic flow merely provides an example of how the general functionality described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited to this context.

Figure 1:
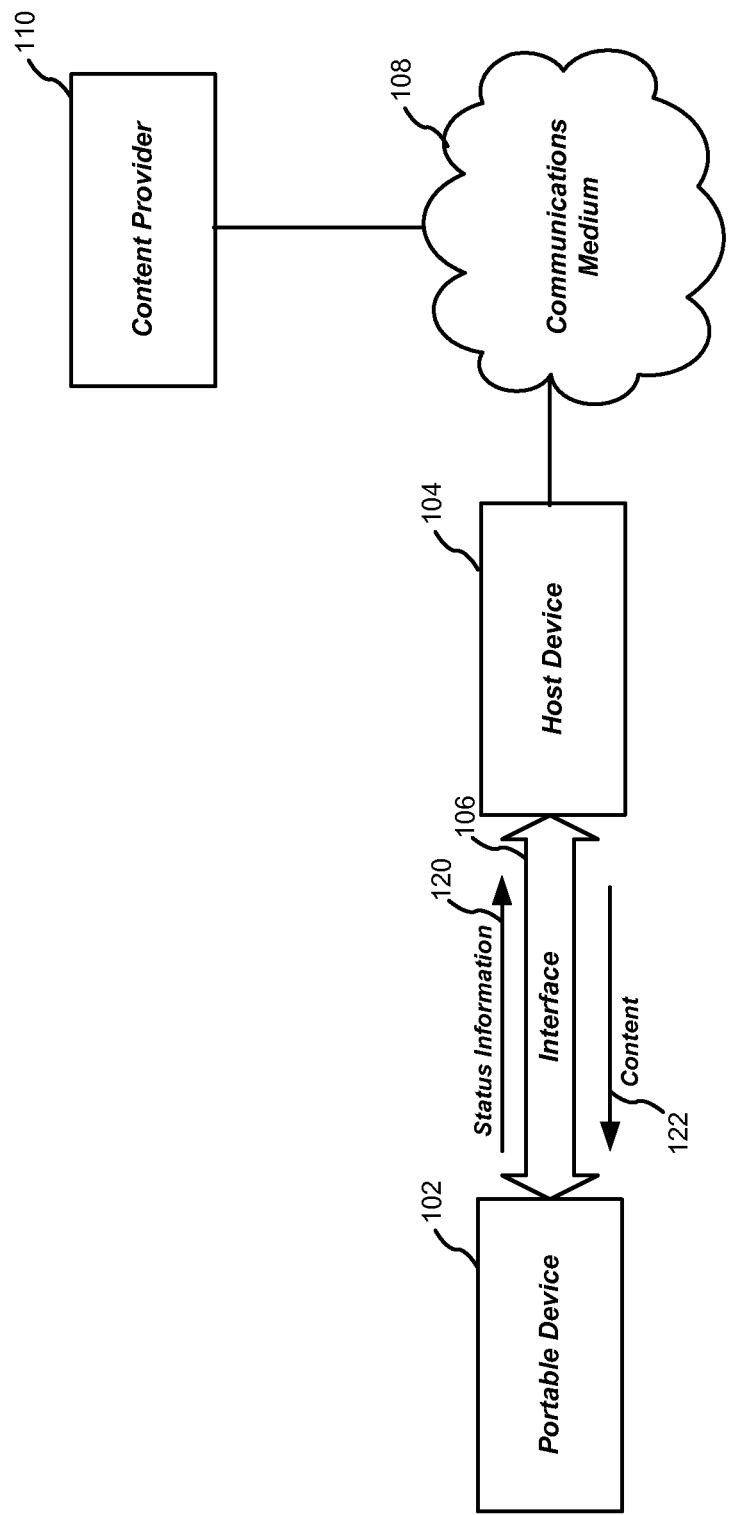
FIG. 1 is a diagram of an exemplary operational environment.

FIG. 1 is a diagram showing an operational environment 100 in which the techniques described herein may be employed. As shown in FIG. 1, operational environment 100 includes a portable device 102, a host device 104, a communications medium 108 and a content provider 110.

Portable device 102 may receive content 122 from host device 104. In embodiments, this received content is automatically provided based on status information 120 that portable device 102 provides to host device 104. Upon receipt of content 122, a user of portable device 102 may store it. Also, the user may output the content (e.g., for viewing and/or listening).

In another embodiment portable device 102 may acquire content from another device other than host device 104. In this case, host device 104 will track content stored and viewed on portable device 102, even though that content may be form another source, such as a second portable device, a second host system, or a direct connection from the portable device to a content provider.

Also, in embodiments, a user of portable device 102 may manually select content 122. This selection may involve the user browsing listings of content stored by host device 104. Also, a user of portable device 104 may request host device 104 to obtain content from a provider (e.g., content provider 110) and send it to portable device 102 (as content 122).

Portable device 102 may be implemented as various device types. Exemplary device types include (but are not limited to) notebook or laptop computers, personal digital assistants (PDAs), mobile telephones, mobile Internet devices (MIDs), and so forth. Moreover, in embodiments, portable device 102 does not have to be portable. For instance, this device may be a stationary PVR, a desktop personal computer, a set-top box, as well as other types of devices.

Host device 104 receives and stores content from one or more content providers. Accordingly, host device 104 may be various types of devices. Exemplary devices include a personal computer, a PVR, and a set-top box. Embodiments, however, are not limited to these examples. For purposes of illustration, FIG. 1 shows host device 104 receiving content from content provider 110 through communications medium 108.

Communications medium 108 may include (but is not limited to) any combination of wired and/or wireless resources. For example, communications medium 108 may include resources provided by any combination of cable television networks, direct video broadcasting networks, satellite networks, cellular networks, wired telephony networks and/or data networks, wireless data networks (e.g., wireless local area networks, wireless personal area networks, etc.), the Internet, and so forth.

Content provider 110 may include any entities that can provide content for consumption by user devices. Examples of content providers 110 include (but are not limited to) television broadcast stations, servers, peer-to-peer networking entities (e.g., peer devices), and so forth.

As described herein, portable device 102 and host device 104 may exchange information (e.g., content 122 and status information 120). FIG. 1 shows that this exchange may occur across an interface 106. Interface 106 exists between these devices when they are capable of exchanging such information. In embodiments, interface 106 may be any combination of wired or wireless communications media.

Exemplary wired media include (but are not limited to) bus interfaces (e.g., Universal Serial Bus (USB) interfaces, computer system bus interfaces, etc.), parallel interfaces, serial interfaces, local area networks (e.g., Ethernet), and power line networks (e.g., HomePlug Power Alliance networks). Wireless media may provide for the exchange of information in accordance with various technologies. Such technologies include (but are not limited to) Bluetooth, IEEE 802.11, IEEE 802.16, long term evolution (LTE), wireless gigabit (WiGIG), ultra wideband (UWB), Zigbee, wireless local area networks (WLANs), wireless personal area networks (WPANs), and cellular telephony. It is noteworthy that portable device 102 may connect to host device 104 over Internet, as well as other suitable networks.

In embodiments, status information 120 may include information regarding operational characteristics of portable device 102. For example, status information 120 may indicate the available content storage capacity of portable device 102. Also, status information 120 may include information regarding the output of content (e.g., viewing and/or listening activity) for users of portable device 102. Further, status information 120 may convey manual user requests for particular content.

Content 122 may include various forms of user perceptible information. Exemplary content includes (but is not limited to) video (e.g., television programming and movies), images, audio, text documents, e-mail, electronic books, and so forth.

In general operation, a user of portable device 102 devotes a portion of its storage medium (e.g., 20 gigabits), to storing content (e.g., PVR content) received from host device 104. When potable device 102 and host device 104 are available to each other (e.g., when interface 106 exists), a synchronization operation may occur. This may involve content stored by host device 104 being copied into a storage medium within portable device 102.

In embodiments, host device 104 may track synchronization activities of portable device 102. Thus, over time, host device 104 may develop a user history involving the synchronization of portable device 102 to host device 104. This history may be based on content 122, which is provided to portable device 102. Additionally or alternatively, this history may be based on status information 120 that host device 104 receives from portable device 102.

Based at least on this history, host device 104 anticipates desired synchronizations of portable device 102. For example, host device 104 may develop a user history indicating that a user of portable device 102 has copied two episodes of a television series two weeks in a row. On the third week, host device 104 (based on the user history) will automatically provide (synchronize) portable device 102 with the latest episode of the same television series. As described herein, this may occur when interface 106 exists.

Further, host device 104 may synchronize content to portable device 102 based upon other information and/or heuristics (e.g., based on status information 120). For example, if substantial available content storage capacity exists within portable device 102, then host device 104 may provide (synchronize) portable device 102 with other television programs in the same genre. However, if there is not sufficient available storage capacity within portable device 102, then synchronization of such automatically selected content may be bypassed (e.g., based on a content priority scheme determined by host device 104). Alternatively or additionally, synchronization of such automatically selected content may include host device 104 directing portable device 102 to delete content to create sufficient available storage capacity for the automatically selected content.

Figure 2:
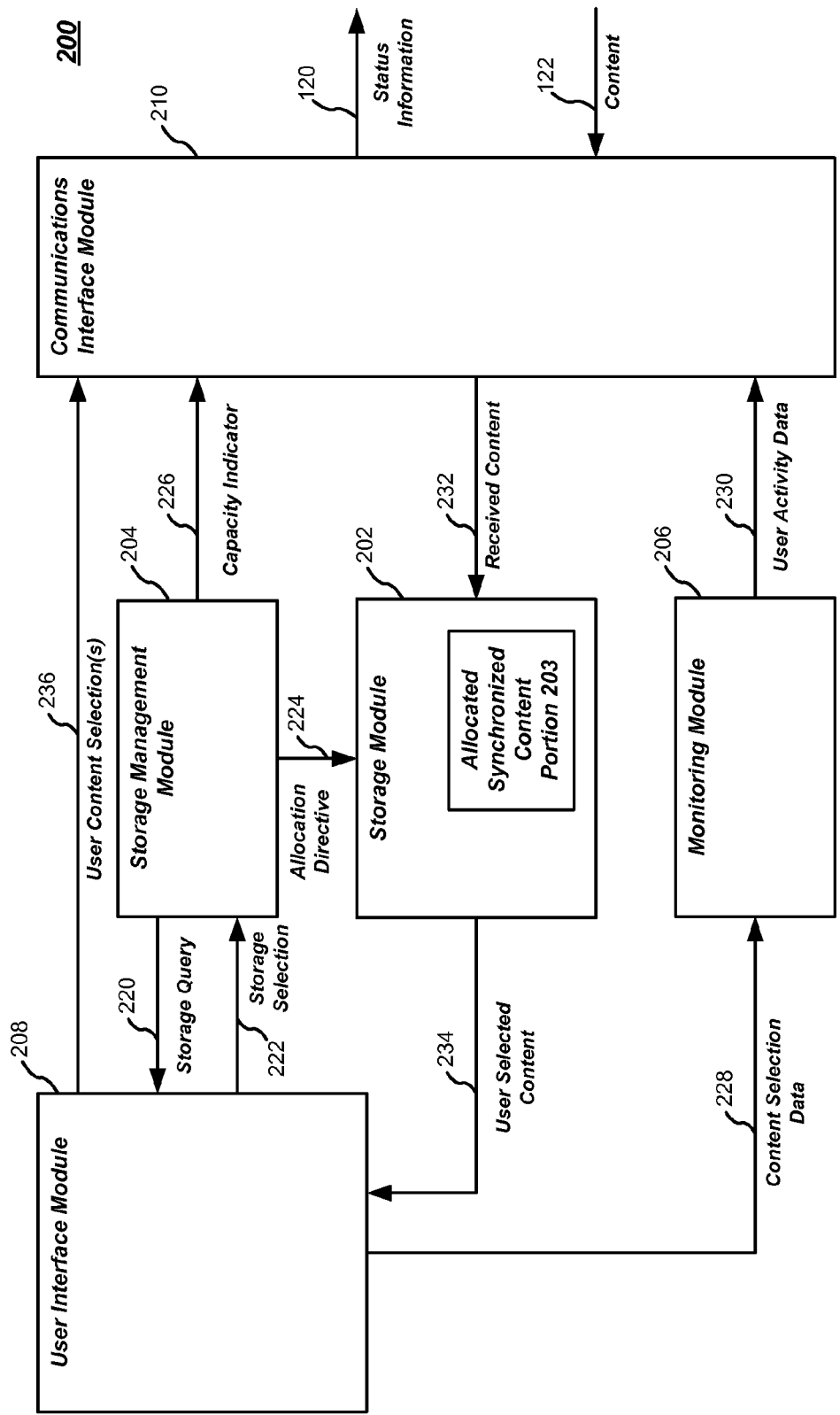
FIGS. 2 and 3 are diagram of exemplary implementations.

FIG. 2 is a diagram of an exemplary implementation 200 that may be employed in portable device 102. Implementation 200 may include various elements. For instance, FIG. 2 shows implementation 200 including a storage module 202, a storage management module 204, a monitoring module 206, a user interface module 208, and a communications interface module 210. These elements may be implemented in any combination of hardware and/or software. Moreover, implementation 200 includes elements that may store information. Thus, implementation 200 may include storage media (e.g., memory, magnetic disk storage, etc.) to provide such storage features. Examples of storage media are provided below.

Storage module 202 stores information, such as data, control logic (e.g., software instructions), and so forth. In particular, storage module 202 may store synchronized content received from a host device (e.g., host device 104). As shown in FIG. 2, this content may be stored in an allocated synchronized content portion 203 within storage module 202. In embodiments, portion 203 may be based on a user selection. Storage module 202 may be implemented with one or more storage media. Exemplary storage media are described below.

Storage management module 204 performs operations involving the management of storage module 202. For instance, storage management module 204 allocates portion 203 within storage module 202. As described herein, this allocation may be based on a user selection. Accordingly, FIG. 2 shows storage management module 204 generating a storage query 220, which is sent to user interface module 208 for output to a user (via a user interface device). This query asks the user to select a size of portion 203. In response, the user makes a selection through the user interface device. In turn, user interface module 208 forwards this selection to storage management module 204 as storage selection 222. Based on storage selection 222, storage management module 204 generates an allocation directive 224, which cause portion 203 to be allocated.

Additionally, storage management module 204 monitors the status of portion 203. For instance, FIG. 2 shows storage management module 204 generating a capacity indicator 226. This indicator provides information regarding content storage capacity. For example, capacity indicator 226 may indicate how much available (unused) storage capacity exists in portion 203. As shown in FIG. 2, capacity indicator 226 is sent to communications interface module 210 for forwarding to a host device (e.g., within status information 120).

Further, storage management module 204 may delete content from portion 203. Such deletions may be performed upon the occurrence of one or more conditions. Exemplary conditions include, the content being stored within portion 203 for longer than a predetermined time threshold, a user manually selecting content to be deleted, the content having already been outputted (e.g., viewed) by a user, and/or receipt of an instruction from a host device to delete the content. Embodiments are not limited to these examples.

Monitoring module 206 tracks user activities. For example, monitoring module 206 may determine content that is outputted by a user. Accordingly, FIG. 2 shows monitoring module 206 receiving content selection data 228, which indicates content within content portion 203 that the user has selected for output (e.g., viewing and/or listening). Further, content selection data 228 may indicate content that the user has requested to receive from a host device. Based on such data, monitoring module 206 generates user activity data 230, which is sent to communications interface module 210 for forwarding to the host device (e.g., within status information 120).

User interface module 208 facilitates user interaction with implementation 200. This interaction may involve the input of information from a user and/or the output of information to a user. Accordingly, user interface module 208 may include one or more devices, such as a keypad, a touch screen, a microphone, and/or an audio speaker. In addition, user interface module 208 may include a display to output information and/or render images/video processed by apparatus 200. Exemplary displays include liquid crystal displays (LCDs), light emitting diode (LED) displays, plasma displays, and video displays.

Further, user interface module 208 may include features to control the exchange of information with users. For instance, user interface module 208 may include decoders (e.g., video and/or audio decoders) that allow content to be output by one or more devices (e.g., displays, speakers, etc.). Moreover, user interface module 208 may provide graphical user interface features. Such features may be implemented in any combination or hardware and/or software.

As described herein, users may manually request content from a host device. Accordingly, FIG. 2 shows user content selection(s) 236 being sent from user interface module 208 to communications interface module 210. In turn, these selection(s) may be forwarded to a host device (e.g., within status information 120). Users may make these selection(s) based on content listings. Such listings may be provided by a host device (e.g., host device 104).

Communications interface module 210 provides for the exchange of information with a host device (e.g., host device 104). As described herein, such exchanges may be across an interface, such as interface 106. Thus, communications interface module 210 receives content 122 (from a host device) and forwards it to storage module 202 (shown as received content 232). In turn, storage module 202 stores this content in portion 203. Further, content 122 may include instructions for particular content to be deleted within storage module 202. A host device may provide such instructions to make space for the storage of new content.

Also, communications interface module 210 may combine various data into status information 120. Examples of such data include (but are not limited to) capacity indicator 226, user activity data 230, and user content selection(s) 236. Upon establishment of an interface with a host device (e.g., interface 106), communications interface module 210 sends status information to the host device.

In embodiments, communications interface module 210 may include interface control logic to operate according to various interface techniques (e.g., serial port, parallel port, USB, etc.), and/or control logic to operate in accordance with one or more communications protocols. Moreover, communications interface module 210 may include various elements, including (but not limited to) transceiver(s), modulators, demodulators, upconverters, downconverters, mixers, buffers, filters, and/or amplifiers.

Figure 3:
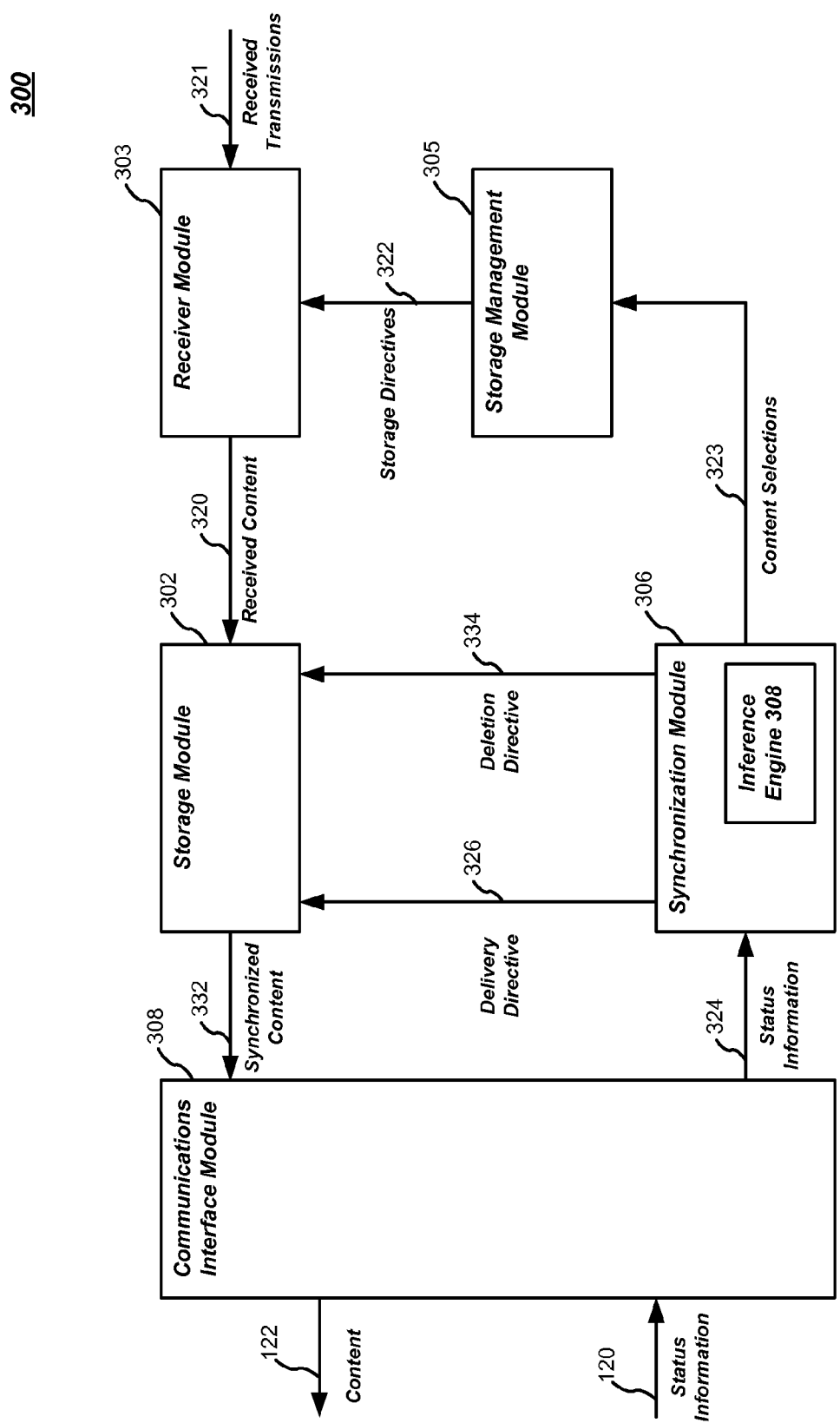

FIG. 3 is a diagram showing an exemplary implementation 300 that may be employed in host device 104. Implementation 300 may include various elements. For instance, FIG. 3 shows implementation 300 including a storage module 302, a receiver module 303, a storage management module 305, a synchronization module 306, and a communications interface module 308. These elements may be implemented in any combination of hardware and/or software. Moreover, implementation 300 includes elements that may store information. Thus, implementation 300 may include storage media (e.g., memory, magnetic disk storage, etc.) to provide such storage features. Examples of storage media are provided below.

Storage module 302 stores content 320 that is received from one or more content providers (such as content provider 110). This stored content may be available for local output. Additionally or alternatively, this stored content may be synchronized to one or more portable devices. Storage module 302 may be implemented with one or more storage media. Examples of storage media are described below.

FIG. 3 shows that implementation 300 receives content from providers through receiver module 303. In particular, FIG. 3 shows receiver module 303 receiving transmissions 321. These transmissions may be in the form of one or more signals. Exemplary signals include RF signals (e.g., television broadcast transmissions) and baseband signals. Such signals may be received from a wireless or wired medium.

From transmissions 321, receiver module 303 generates corresponding content 320. This generation may involve various operations. Exemplary operations include (but are not limited to) tuning, filtering, amplification, demodulation, and/or decoding. Accordingly, receiver module 303 may include elements to perform such operations. These elements may be implemented in any combination of hardware and/or software.

In embodiments, the generation of content 320 is determined by storage management module 305. For instance, FIG. 3 shows storage management module 305 sending generation directives 322 to receiver module 303. These directives instruct receiver module 303 to obtain content 320. Accordingly, directives 322 may specify one or more reception parameters to be employed by receiver module 303. Examples of reception parameters include (but are not limited to) tunings and/or other physical reception parameters, broadcast channel identifiers, reception times, and resource indicators (e.g., network addresses) that specify particular content.

Storage management module 305 may produce directives 322 based on user selections (e.g., host device user selections and/or portable device user selections). Further, storage management module 305 may produce directives 322 based on automatic selections (e.g., predictive selections, which predict content that may be desirable to users). Accordingly, FIG. 3 shows storage management module 305 receiving such selections from synchronization module 306 (as content selections 323).

FIG. 3 shows that synchronization module 306 receives status information 324 from communications interface module 308. In embodiments, status information 324 includes information conveyed in status information 120 (which is received from a portable device). Thus, in the context of FIG. 2, status information 324 may include (but is not limited to) user activity data 230, capacity indicator 226, and/or user content selection(s) 226. From such information, synchronization module 306 selects content for synchronization with portable devices. In turn, synchronization module 306 may convey these selections in content selections 323 and/or delivery directive 326.

As described above, content selections 323, which are sent to storage management module 305, indicate content to be obtained from remote content providers. Once obtained, such content may be synchronized to a portable device.

In contrast, delivery directive 326, which is sent to storage module 302, directs particular content within storage module 302 to be synchronized (e.g., copied) to a portable device. Further, delivery directive 326 may contain instructions for the deletion of content stored by the portable device. Such deletions may be in order to create storage space for new content within the portable device. As a result, storage module 302 sends the content and/or deletion instructions specified by directive 326 to communications interface module 308 (as synchronized content 332). In turn, communications interface module 308 forwards this content to the portable device (e.g., as content 122).

In embodiments, synchronization module 306 issues delivery directive 326 when it determines (e.g., through status information 324) that the portable device is available for synchronization. For example, in the context of FIG. 2, synchronization module 306 may issue delivery directive 326 when interface 106 exists.

FIG. 3 shows that synchronization module 306 includes an inference engine 308. Inference engine 308 automatically generates predictive selections of content that would be desirable to a portable device's user. In turn, such predictive selections may be indicated in delivery directive 326 and/or content selections 323.

The generation of such predictive selections may involve making inferences based on various factors, such as previous content that was provided to the portable device, and/or information provided in status information 324. Moreover, making such inferences may involve the employment of one or more heuristics, which may be weighted in various ways. Exemplary heuristics are now described.

An exemplary heuristic is based on previous synchronization activities. For instance, previously synchronized content within a particular category and/or time interval may cause the selection of similar content for synchronizing with a portable device. As an example, if a portable device user has explicitly synchronized two episodes from the same TV series within three days of recording on the host device, subsequent recordings of the show are automatically selected and synchronized to the portable device.

A further exemplary heuristic is based on output habits (e.g., viewing and/or listening habits) on a portable device. For instance, increased outputting of content in a particular category or type may result in selecting further content of similar category or type for synchronizing with a portable device. As an example, if a portable device user watches three or more episodes of shows of the same genre (e.g., situation comedies) on the portable device, recently recorded episodes in that genre are automatically selected and synchronized to the portable device.

Yet a further exemplary heuristic involves outputting (e.g., viewing and/or listening) and recording habits on the host device. For instance, increased viewing or recording of particular content by a user of the host device may result in the selection of the same or similar content for synchronizing with a portable device. As an example, if a user of a host device views or records three TV episodes of the same genre, subsequent recordings on the host device are automatically selected and synchronized to the portable device.

Another exemplary heuristic involves what other people (e.g., friends, acquaintances, family, etc.) view. For instance, selections and/or outputting of content by a predetermined group of persons (e.g., on any device) may result in the selection of the same or similar content for synchronizing with a portable device.

Still a further exemplary heuristic involves explicit user ratings of content (which may be inputted and received from users of portable device(s) and/or the host device). For instance, high user ratings of content may cause the selection of similar content for synchronizing with a portable device. As an example, if a user rates two police drama TV episodes highly, other police drama TV episodes are automatically selected and synchronized to the portable device.

The aforementioned heuristics are provided as examples, and not limitations. Accordingly any number of heuristics in any combination or weighting may be employed.

In embodiments, synchronization module 306 may cause the deletion of content stored in storage module 302. For instance, FIG. 3 shows synchronization module 306 sending storage module 302 a deletion directive 334, which directs storage module 302 to delete particular content. Such directives may be generated when the content to be deleted has been outputted (e.g., viewed and/or listened to) by a user of a portable device.

Additionally or alternatively, synchronization module 306 may perform synchronization operations for multiple portable devices. This may involve synchronization module 306 maintaining profiles and information for multiple portable devices. In such cases, synchronization module 306 may identify particular content as being interesting to users of multiple portable devices. When this occurs, synchronization module 306 may direct content to be deleted from storage module 302 only after all such portable devices have outputted the content.

Communications interface module 308 provides for the exchange of information with a portable device (e.g., portable device 102). This information may include status information 120 and content 122. As described herein, such exchanges may be across an interface, such as interface 106.

Thus, communications interface module 308 may include interface control logic to operate according to various interface techniques (e.g., serial port, parallel port, USB, etc.), and/or control logic to operate in accordance with one or more communications protocols. Moreover, communications interface module 308 may include various elements, including (but not limited to) transceiver(s), modulators, demodulators, upconverters, downconverters, mixers, buffers, filters, and/or amplifiers.

Figure 4:
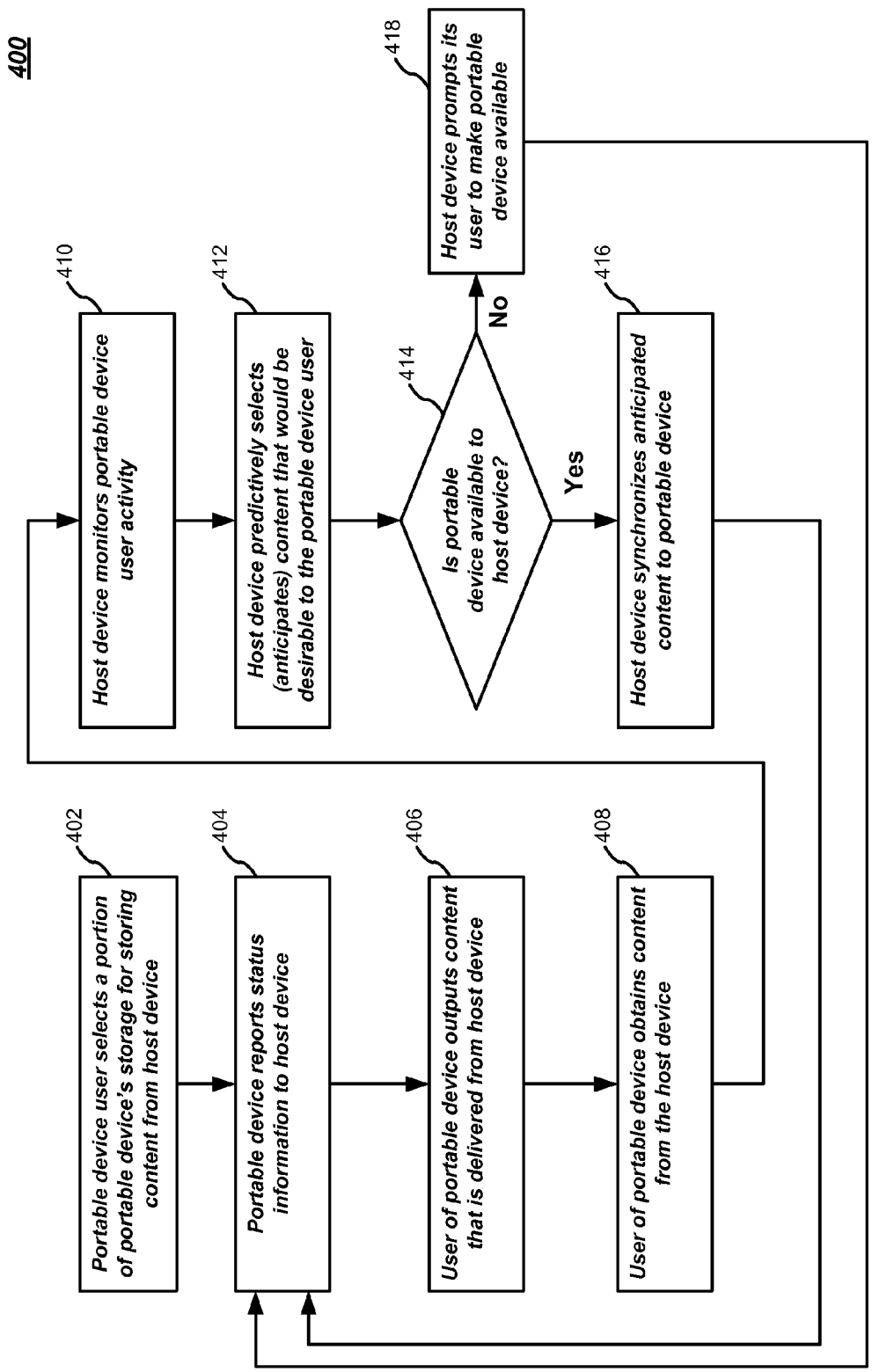
FIG. 4 is a logic flow diagram.

The implementations of FIGS. 3 and 4 are provided for purposes of illustration and not limitation. Accordingly, other implementations may be employed. For example, in alternate implementations, elements of implementation 300 may be included in other devices, such as portable devices. Such elements may include (but are not limited to) synchronization module 306 and/or inference engine 308.

FIG. 4 illustrates an exemplary logic flow 400, which may be representative of operations executed by one or more embodiments described herein. Thus, this flow may be employed in the contexts of FIGS. 1-3. Embodiments, however, are not limited to these contexts. Also, although FIG. 4 shows particular sequences, other sequences may be employed. Moreover, the depicted operations may be performed in various parallel and/or sequential combinations.

At a block 402, a user of a portable device selects a portion of the portable device's storage to store content from a host device. At a block 404, the portable device reports status information to host device. In the context of FIGS. 1-3, this information may be included in status information 120. Accordingly, block 404 may occur when the portable device is available to the host device (e.g., when interface 106 exists).

At a block 406, the portable device user outputs (e.g., views and/or listens to) content that was provided by the host device. Further, at a block 408, the portable device user obtains content from the host device. In embodiments, this content may be manually selected by the portable device user. For instance, the portable device user may make such manual selections from content listings and/or schedules. Such schedules may be provided by the host device. Embodiments, however, are not limited to these examples.

The host device monitors portable device activity (e.g., content requested, content received, content outputted, and/or available storage capacity) at a block 410. As described herein, information regarding such activity may be provided to the host device in status information 120. Thus, block 410 may be performed when the portable device is available to the host device (e.g., when interface 106 exists).

Based on such monitoring, a block 412 is performed. At this block, the host device may anticipate (predictively select) content that would be desirable to the portable device's user at a block 412. Such selections may involve making one or more inferences. Accordingly, in the context of FIG. 3, such selections may be made by inference engine 308.

As indicated by a block 414, the host device determines whether the portable device is available to the host device (e.g., whether interface 106 exists). If so, then operation proceeds to a block 416, where the selected content is synchronized (e.g., copied) to the portable device.

However, if the portable device is not available, then a block 418 may be performed. At this block, the host device prompts its user to make the portable device available. This prompting may be performed through a user interface (e.g., a display) of the host device and/or of an output device connected to the host device.

FIG. 4 shows that following blocks 416 and 418, operation returns to block 404. Thus, the sequences described herein may be performed repeatedly.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

Some embodiments may be implemented, for example, using a storage medium or article which is machine readable. The storage medium may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software.

As described herein, embodiments may include storage media or machine-readable articles. These may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

While various embodiments of the present invention have been described above, it should be understood that they have been presented by way of example only, and not in limitation. Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

The invention claimed is:

1. A method comprising:
receiving information at a host from a device through a communications interface module regarding available storage capacity of the device for content;
receiving information at the host from the device through the communications interface module regarding previous activity of a user of the device;
making one or more inferences using combined and weighted heuristics regarding content that the user of the device would prefer to receive based on the received information;
automatically predictively selecting at the host content for consumption by the user of the device based at least on the inferences;
sending the content selections to a storage management module;
receiving the content selections and generating storage directives based on the content selections to send to a receiver to instruct the receiver to obtain the selected content, the storage directives specifying reception parameters to be used by the receiver to obtain the selected content;
determining that the device is available for synchronization;
sending a deletion directive to the communications interface module to instruct the device to delete content previously provided to the device for storage by the device based on the received available content storage capacity and the content selections; and
sending a delivery directive to the communications interface module to provide the selected content to the device for storage on the device when the device is available.

2. The method of claim 1, wherein selecting content is further based on an available content storage capacity in the device.

3. The method of claim 1, wherein the heuristics include previous content provided to the device for storage.

4. The method of claim 1, wherein the heuristics include content previously outputted by the device.

5. The method of claim 4, wherein the deletion directive includes instructing the device to delete content comprises instructing the device to delete content previously outputted by the device.

6. The method of claim 1, wherein the heuristics include identifying content similar to content previously provided to the device.

7. The method of claim 1, wherein the heuristics include identifying content similar to content previously output by the device.

8. The method of claim 1, wherein the heuristics include identifying content based on content stored in a host device.

9. The method of claim 1, wherein making one or more inferences comprises identifying content based on ratings of similar content made by the user of the device.

10. The method of claim 1, wherein providing the selected content is performed by the host device.

11. An apparatus, comprising:
a storage the storage including an allocated portion to store content received from a host device;
a monitor to generate user activity data;
a communications interface wherein the communications interface is to send status information from the monitor to the host device, the status information including a user content selection, previous activity of a user of the apparatus and to send an available storage capacity within the allocated portion of the storage from the storage to the host device; and wherein the communications interface is to receive a deletion directive including instructions to delete content previously stored in the allocated portion of the host medium and, to receive a deliver directive to provide additional content from the host device for storage in the allocated portion of the storage, the additional content coming at least in part from a receiver at the host device that receives storage directives to obtain selected content, the storage directives specifying reception parameters to be used by the receiver to obtain the selected content;
wherein the instruction to delete content is based on the received available storage capacity, and
wherein the received content is automatically predictively selected based at least on the status information, and one or more inferences regarding content the user would prefer to receive, the inference being made using combined and weighted heuristics.

12. An article comprising a machine-accessible device having stored thereon instructions that, when executed by a machine, cause the machine to:
receive information at a host from a device through a communications interface module regarding available storage capacity of the device for content;
receive information at the host from the device through the communications interface module regarding previous activity of a user of the device;
make one or more inferences using combined and weighted heuristics regarding content that the user of the device would prefer to receive based on the received information;
automatically predictively select at the host content for consumption by the user of the device based at least on the inferences;
send the content selections to a storage management module;
receive the content selections and generating storage directives based on the content selections to send to a receiver to instruct the receiver to obtain the selected content, the storage directives specifying reception parameters to be used by the receiver to obtain the selected content;
determine that the device is available for synchronization;
send a deletion directive to the communications interface module to instruct the device to delete content previously provided to the device for storage by the device based on the received available content storage capacity and the content selections; and
send a delivery directive to the communications interface module to provide the selected content to the device for storage on the device when the device is available.

13. The article of claim 12, wherein the heuristics include a user content selection for reception from the host device.

14. The article of claim 12, further comprising a user interface, the user interface to receive a user selection of a storage capacity of allocated storage in the device.

15. The article of claim 12, wherein the deleted content is manually selected by a user of the host.

16. article of claim 12, wherein the communications interface is to send the status information from the apparatus over the Internet, and wherein the communications interface is to receive the content from the host device over the Internet.

17. An apparatus, comprising:
a communications interface to receive information from a user device regarding available content storage capacity of the user device and previous activity of a user of the user device;
a synchronization device having an inference engine to make one or more inferences using combined and weighted heuristics regarding content that the user of the user device would prefer to receive based on the received information, to automatically predictively select content for consumption by the user of the user device based at least on the inferences, and to send the content selections to a storage manager
the storage manager to receive the content selections from the synchronization device and to generate storage directives based on the content selections to send to a receiver to instruct the receiver to obtain the selected content, the storage directives specifying reception parameters to be used by the receiver to obtain the selected content;
a storage to store the automatically selected content including content received by the receiver; and
the communications interface module further to receive a deletion directive from the synchronization module to instruct the user device to delete previously provided content based on the available content storage capacity and to receive a delivery directive from the synchronization device to send the automatically selected content from the storage to the user device for storage on the user device when the user device is available.

18. The apparatus of claim 17, wherein the inference engine automatically selects the content based on an available content storage capacity in the user device received from the user device.

19. The apparatus of claim 17, wherein the communications interface is to send the automatically selected content to the user device over the Internet.

20. The article of claim 12, wherein the heuristics include a user content selection for output.

* * * * *